United States Patent
Sampath et al.

(10) Patent No.: US 8,738,906 B1
(45) Date of Patent: May 27, 2014

(54) TRAFFIC CLASSIFICATION AND CONTROL ON A NETWORK NODE

(75) Inventors: Dhananjay Sampath, Sunnyvale, CA (US); Chetan Anand, Sunnyvale, CA (US); Arjun Sambamoorthy, San Jose, CA (US); Anand Deshpande, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 104 days.

(21) Appl. No.: 13/308,212

(22) Filed: Nov. 30, 2011

(51) Int. Cl.
*H04N 21/80* (2011.01)
*H04N 21/83* (2011.01)

(52) U.S. Cl.
USPC .......................................... 713/166; 713/167

(58) Field of Classification Search
None
See application file for complete search history.

(56) References Cited

U.S. PATENT DOCUMENTS

| | | | | |
|---|---|---|---|---|
| 2004/0193870 | A1* | 9/2004 | Redlich et al. | 713/154 |
| 2007/0011745 | A1* | 1/2007 | Mitomo et al. | 726/24 |
| 2007/0107053 | A1* | 5/2007 | Shraim et al. | 726/22 |
| 2010/0274834 | A1* | 10/2010 | Tang et al. | 709/202 |
| 2011/0258197 | A1* | 10/2011 | de la Iglesia et al. | 707/741 |
| 2011/0310901 | A1* | 12/2011 | Uchida et al. | 370/392 |

OTHER PUBLICATIONS

Statistical Classification, http://en.wikipedia.org/wiki/Classifier_(mathematics).com, 5 pages, print date Nov. 29, 2011.
Naïve Bayes Classifier, http://en.wikipedia.org/wiki/Naive_Bayes_classifier.com, 10 pages, print date Nov. 29, 2011.
uClassify XML API Documentation, http://www.uclassify.com/XMLApiDocumentation.aspx , 9 pages, print date Nov. 29, 2011.
N. Friedman et al., "Bayesian Network Classifiers", Machine Learning, vol. 29, pp. 131-163 (1997).
Jon Kagstrom, "Master Thesis—Improving Naïve Bayesian SPAM Filtering", Mittuniversitetet Mid Sweden University, 68 pages, Spring 2005.

* cited by examiner

*Primary Examiner* — Venkat Perungavoor
(74) *Attorney, Agent, or Firm* — Harrity & Harrity, LLP

(57) ABSTRACT

A system may identify one or more attributes associated with traffic. The system may then determine that at least one attribute, of the one or more attributes, matches an attribute of a set of attributes that correspond to a set of categories of traffic. Based on determining that the at least one attribute matches the attribute of the set of attributes, the system may identify a category, of the set of categories, that corresponds to the attribute. The system may associate the category with the traffic, and process the traffic based on the associated category.

23 Claims, 8 Drawing Sheets

TRAFFIC CLASSIFICATION AND CONTROL ON A NETWORK NODE

BACKGROUND

Communication networks typically include nodes, such as routers, firewalls, switches, or gateways, which transfer or switch traffic, such as packets, from one or more sources to one or more destinations. The nodes may operate on the traffic as the traffic traverses the network, such as by forwarding or filtering the packets associated with the traffic.

Nodes may rely on third party services (e.g., off-box services), such as services provided via a network device, another network (e.g., a cloud-based service), etc., to classify traffic being transported via the network. The third party services may classify the traffic to identify traffic types, file types, uniform resource locators (URLs), spam, malicious software, particular network addresses, application types, etc., which may allow the nodes to filter and/or process the traffic based on network policies. Unfortunately, the third party services may not adapt to changing traffic types in a manner that allows the nodes to operate without being exposed to potentially harmful traffic. Relying on the third party services may also cause processing delays, associated with communicating with third party service providers, which may reduce a level of performance associated with the nodes.

SUMMARY

According to one aspect, a method, may include receiving, by a node, traffic being transported via a network; obtaining, by the node and as a result of receiving the traffic, content from one or more packets associated with the traffic; and analyzing, by the node, the content to identify one or more attributes associated with the content, where the one or more attributes may correspond to at least one of: a network address, information associated with an application or service, information associated with message content, or information associated with software content. The method may also include determining, by the node, that at least one attribute, of the one or more attributes, matches an attribute, of a group of attributes, that is stored within a memory associated with the node, where the group of attributes may correspond to a group of categories of traffic; identifying, by the node, a category, of the group of categories, that corresponds to the attribute; associating, by the node, the category and the traffic; and processing, by the node, the traffic based on the associated category.

According to another aspect, a node may include a memory to store classification information for a set of categories of traffic, where the classification information, for a particular one of the set of categories, may identify at least one of: a network address attribute, an application attribute associated with a flow of packets, a text, image, or video attribute, or a file attribute. The node may further include one or more processors to receive packets associated with traffic being transported via a network; obtain content from the packets; analyze the content to identify attributes associated with the content; and identify respective classification information, for each of one or more categories, of the set of categories, that includes one or more of the attributes. The node may also include the one or more processors to rank the one or more categories based on each quantity of the one or more of the attributes included within the respective classification information; assign, to the traffic, a particular category, of the one or more categories, associated with a highest rank of the one or more categories; and process the traffic in a manner identified by a policy that indicates how the traffic is to be processed when the particular category is assigned to the traffic.

According to still another aspect, one or more computer-readable media, may include a group of instructions, which when executed by at least one processor, that cause the at least one processor to receive an instruction to train a classifier; obtain, in response to the instruction, predetermined content associated with a set of categories of traffic; analyze the predetermined content to identify classification information associated with each of the set of categories, where the classification information, associated with a particular category of the set of categories, may identify at least one of: a network address associated with the particular category, an application associated with the particular category, key terms or phrases associated with the particular category, an image or video associated with the particular category, or software or a script associated with the particular category. The one or more computer-readable media, may also include a group of instructions, which when executed by at least one processor, that further cause the at least one processor to store the classification information associated with the set of categories; receive packets associated with traffic being transported via a network; obtain content from the packets; analyze the content to identify an attribute associated with the content; identify classification information, associated with a category of the set of categories, that includes the attribute; assign, to the traffic, the category with which the identified classification information is associated; and process the traffic based on the category assigned to the traffic.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

A system and/or method, described herein, may enable a node to train a classifier based on predetermined content associated with one or more categories of traffic. The node may analyze the predetermined content to identify unique attributes that correspond to each category of the content and may generate classification metrics based on the identified attributes. The classification metrics may be used to train the classifier so that content, obtained from traffic being processed by the node, can be classified without communicating with a third party service provider to obtain classification services.

Classifying the content may enable the node to process the traffic, based on the classification of the content, in a manner that conforms to a policy associated with a network. Classifying the traffic and/or the content may allow the node to provide services, such as website filtering, content filtering, controlling application resource usage, data loss prevention (DLP), anti-spam processing, malicious software identification, etc., without communicating with a third party service provider to classify the traffic and/or provide the services.

The term content, as used herein, may include information obtained from a packet (e.g., a packet payload, header, trailer, label, etc.) that is included within the traffic, such as a source and/or destination addresses (e.g., a uniform resource locator (URL), a uniform resource identifier (URI), an Internet protocol (IP) address, a media access control (MAC) address, etc.), information associated with a traffic flow and/or application (e.g., an application identifier, an application name, an application signature, an access point name (APN), a packet data network (PDN) identifier associated with the APN, etc.) etc. Additionally, or alternatively, content may include a document that is stored within one or more packets obtained from the traffic (e.g., an email message, an instant message, etc.) and/or a document, web-page, etc. that is obtained (e.g., pre-fetched) from a network device (e.g., associated with a web site) based on a network address identified within the one or more packets.

Figure 1:
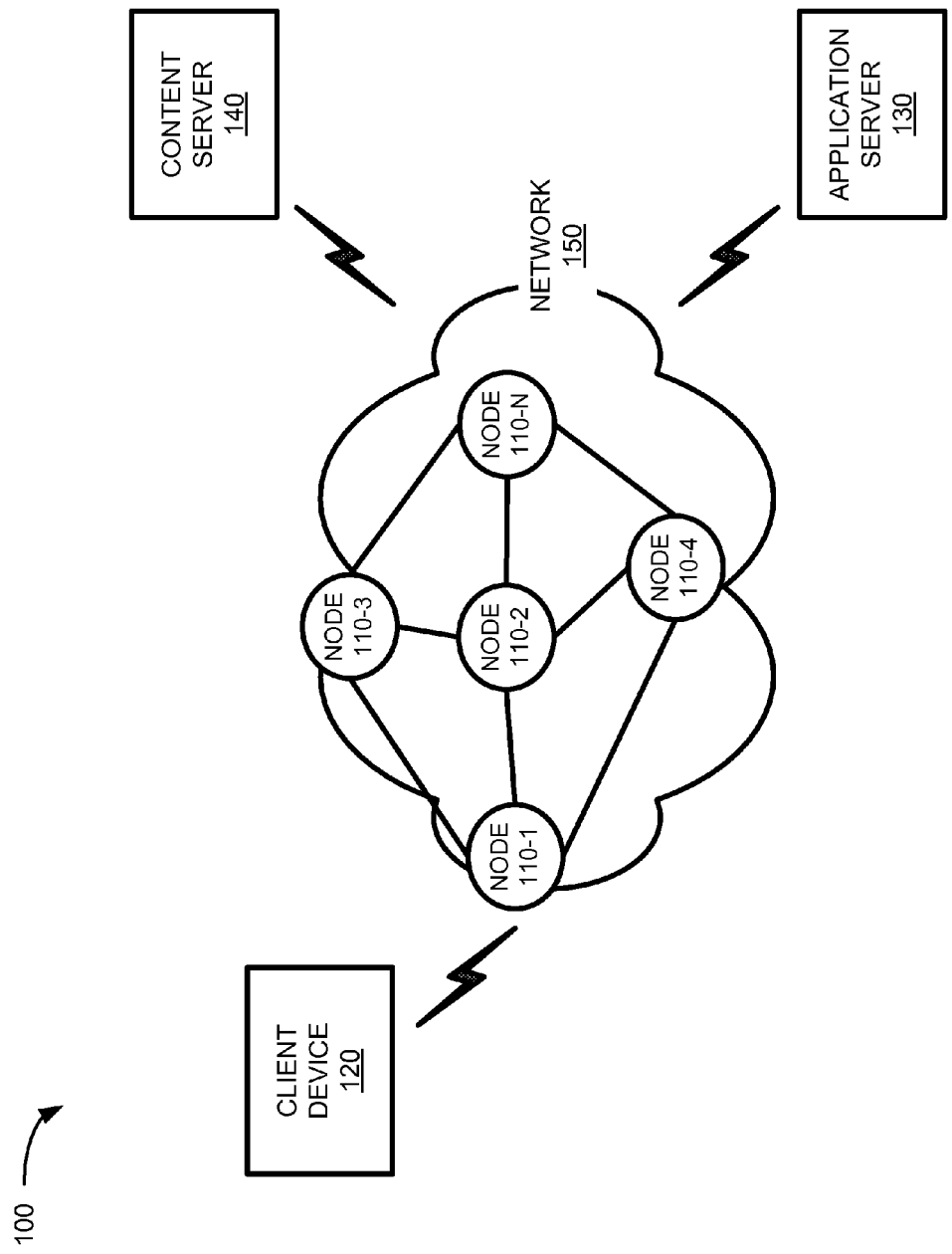
FIG. 1 is a diagram of an example environment in which systems and/or methods described herein may be implemented.

FIG. 1 is a diagram of an example environment 100 in which systems and/or methods described herein may be implemented. As shown in FIG. 1, network 100 may include a group of nodes 110-1, ..., 110-N (where N≥1) (hereinafter referred to collectively as "nodes 110" and individually as "node 110"), a client device 120, an application server 130, a content server 140, and/or a network 150. The quantity of nodes, devices, servers, and/or networks illustrated in FIG. 1, is provided for explanatory purposes only. In practice, there may be additional nodes, devices, servers, and/or networks; fewer nodes, devices, servers, and/or networks; different nodes, devices, servers, and/or networks; or differently arranged nodes, devices, servers, and/or networks than illustrated in FIG. 1. Also, in some implementations, one or more of the nodes, devices, servers, and/or networks of environment 100, may perform one or more functions described as being performed by another one or more of the nodes, devices, servers, and/or networks of network environment 100. The nodes and/or devices of environment 100 may interconnect via wired connections, wireless connections, or a combination of wired and wireless connections.

Node 110 may include a network device that transmits traffic (e.g., packets). For example, node 110 may take the form of a routing device, a switching device, a multiplexing device, a firewall device, or a device that performs a combination of routing, switching, security functions, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables, and/or packet forwarding tables. Node 110 may receive, process, and/or transmit packets traversing network 100. Node 110 may add and/or append (push) information (e.g., headers, trailers, tags, etc.) to incoming and/or outgoing packets. Node 110 may remove and/or extract (pop) information from incoming and/or outgoing packets.

Node 110 may communicate with application server 130 to obtain one or more sets of content associated with a group of categories that are to be used to classify traffic. Node 110 may analyze the sets of content to generate classification metrics associated with the group of categories. Node 110 may analyze content obtained from packets associated with traffic being processed by node 110. Node 110 may also, or alternatively, communicate with content server 140 to obtain (e.g., pre-fetch) content (e.g., a web page, etc.) identified by the packets associated with the traffic (e.g., based on a URL, etc.). Node 110 may use the classification metrics to classify the content based on the classification metrics. Node 110 may process the traffic based on policy information that identifies how the traffic is to be processed based on the classification of the content. Node 110 may identify a particular type of traffic that has not previously been processed by node 110 and/or cannot be classified by node 110 and may obtain, from application server 130, classification metrics that identify how to classify and/or process the traffic.

Client device 120 may include one or more computation or communication devices, such as a communication device that is capable of communicating with network 150. For example, client device 120 may include a desktop computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a set top box, a camera, a personal gaming system, a smart phone, or some other type of computation or communication device.

Application server 130 may include one or more server devices, or other types of computation or communication devices, that gather, process, search, store, and/or provide information in a manner described herein. In an example, application server 130 may manage a repository of traffic and/or content that represents one or more categories of content that may possibly be transported via network 150. Application server 130 may store the repository of content in a memory and/or storage device associated with application server 130. Application server 130 may transmit all or a portion of a copy of the repository of content to node 110 that enables node 110 to train a classifier associated with node 110.

Application server 130 may also, or alternatively, receive, from node 110, a type of traffic and/or content that has not before been processed by node 110. Application server 130 may determine whether the type of traffic or content matches types of traffic or content stored within the repository of traffic or content. Application server 130 may update the repository of traffic and/or content based on a determination that the type of traffic and/or content is not stored within the repository. Application server 130 and/or node 110 may transmit information, associated with the type of traffic and/or content, to another node 110 that enables the other node 110 to update a classifier associated with other node 110. All or a portion of the functions and/or operations described as being performed by application server 130 may also, or alternatively, be performed by node 110.

Content server 140 may include one or more server devices, or other types of computation or communication devices, that gather, process, search, store, and/or provide information in a manner described herein. In an example implementation, content server 140 may host a web site that can be accessed by node 110 and/or may provision web services to node 110. For example, content server 140 may, in response to a request from node 110, provide content (e.g., a web page, a document, video content, an image, etc.) to node 110. Node 110 may analyze the content received from content server 140.

Network 150 may include one or more wired and/or wireless networks. For example, network 150 may include a cellular network, a public land mobile network (PLMN), a second generation (2G) network, a third generation (3G) network, a fourth generation (4G) network, a fifth generation (5G) network, and/or another network. Additionally, or alternatively, network 150 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Figure 2:
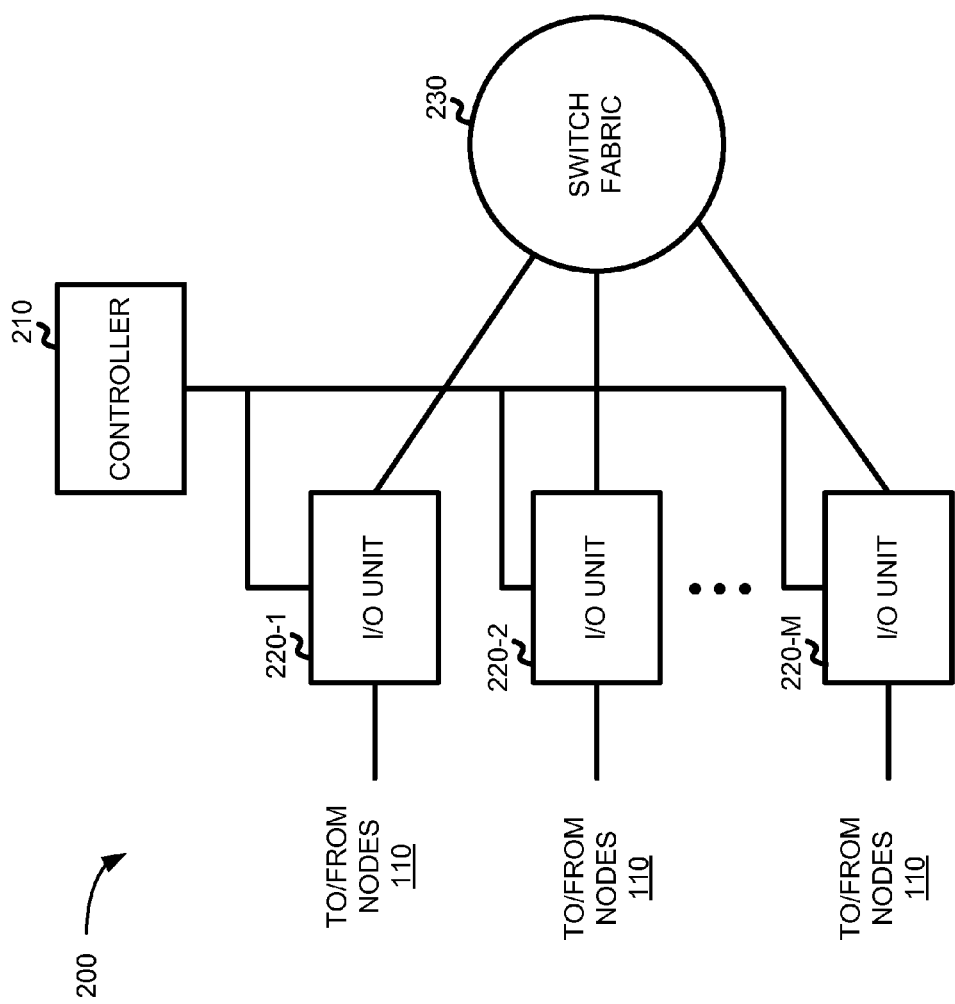
FIG. 2 is a diagram of example components of one or more nodes of FIG. 1.

FIG. 2 is a diagram of example components of a device 200 that may correspond to node 110. Additionally, or alternatively, each node 110 may include one or more of devices 200 and/or one or more components of device 200.

Device 200 may include a controller 210, a set of input/output (I/O) units 220-1, 220-2, . . . , 220-M (where M≥1) (hereinafter referred to collectively as "I/O units 220" and individually as "I/O unit 220"), and a switch fabric 230. Although, FIG. 2 illustrates example components of device 200, in other implementations, device 200 may include additional components, fewer components, different components, or differently arranged components than those illustrated in FIG. 2 and described herein. Additionally, or alternatively, one or more operations described as being performed by a particular component of device 200 may be performed by one or more other components, in addition to or instead of the particular component of device 200.

Controller 210 may include one or more processors, one or more microprocessors, or some form of hardware logic (e.g., an application specific integrated circuit (ASIC) or a field programmable gate array (FPGA)). In one example implementation, controller 210 may include an Ethernet controller and/or another controller device. Controller 210 may perform high-level management functions for device 200. For example, controller 210 may create routing tables based on network topology information, create forwarding tables based on the routing tables, and communicate the forwarding tables to I/O units 220. I/O units 220 may use the forwarding tables to perform route lookups for incoming packets and perform the forwarding functions for device 200. Controller 210 may also perform other general control and monitoring functions for device 200.

I/O unit 220 may include one or more components to receive incoming packets, to process incoming and/or outgoing packets, and/or to transmit outgoing packets. For example, I/O unit 220 may include I/O ports, a packet forwarding component (PFC), an Ethernet interface and/or another type of interface, a central processing unit (CPU), and/or a memory device. I/O unit 220 may include a collection of ports that receive or transmit packets via physical links I/O unit 220 may also include packet processing component(s), switch interface component(s), Internet processor component(s), memory device(s), etc.

Each of I/O units 220 may be connected to controller 210 and switch fabric 230. I/O units 220 may receive packet data on physical links connected to a network (e.g., network 150). Each physical link could be one of many types of transport media, such as an optical fiber or an Ethernet cable.

I/O units 220 may process incoming packet data prior to transmitting the data to another I/O unit 220 or the network. I/O units 220 may perform route lookups for the data using a forwarding table from controller 210 to determine destination information. If the destination indicates that the data should be sent out on a physical link, connected to I/O unit 220, then I/O unit 220 may prepare the data for transmission by, for example, adding any necessary headers and/or transmitting the data from the port associated with the physical link. If the destination indicates that the data should be sent to another I/O unit 220 via switch fabric 230, then I/O unit 220 may, if necessary, prepare the data for transmission to the other I/O unit 220 and/or may transmit the data to the other I/O unit 220 via switch fabric 230.

Switch fabric 230 may include one or multiple switching planes to facilitate communication among I/O units 220 and/or controller 210. In one implementation, each of the switching planes may include a single-stage switch or a multi-stage switch of crossbar elements. Switch fabric 230 may also, or alternatively, include processors, memories, and/or paths that permit communication among I/O units 220 and/or controller 210.

Figure 3:
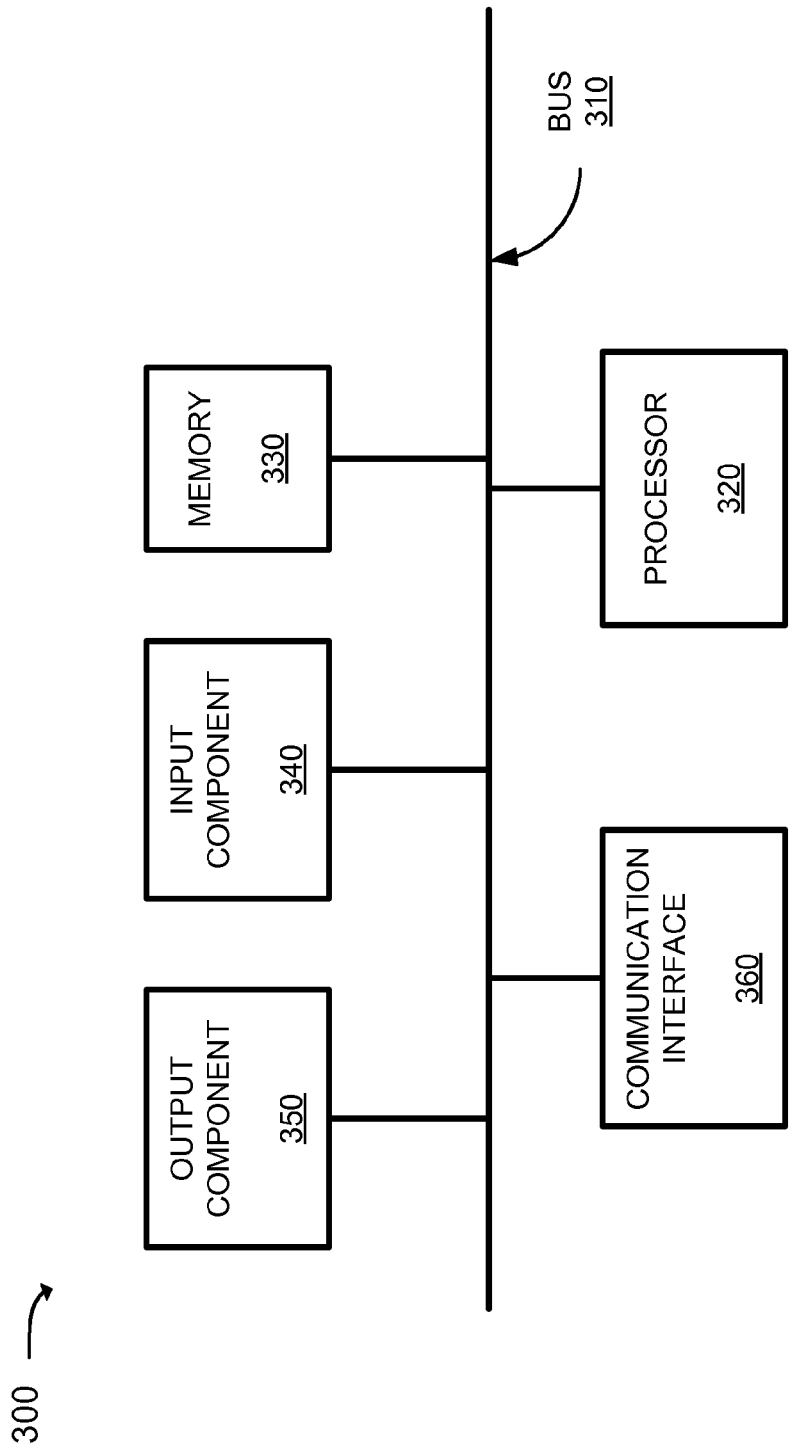
FIG. 3 is a diagram of example components of one or more devices of FIG. 1.

FIG. 3 is a diagram of example components of a device 300 that may correspond to client device 120, application server 130 and/or content server 140. Alternatively, client device 120, application server 130, and/or content server 140 may include one or more devices 300 and/or one or more components of device 300. Device 300 may include a bus 310, a processor 320, a memory 330, an input component 340, an output component 350, and a communication interface 360.

Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 150. In one alternative implementation, communication interface 360 may be a logical component that includes input and output ports, input and output systems, and/or other input and output components that facilitate the transmission of data to other devices.

As described herein, device 300 may perform certain operations associated with retrieving, providing, and/or processing traffic and/or content that has been, or is to be, classified by node 110. Device 300 may perform these and other operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
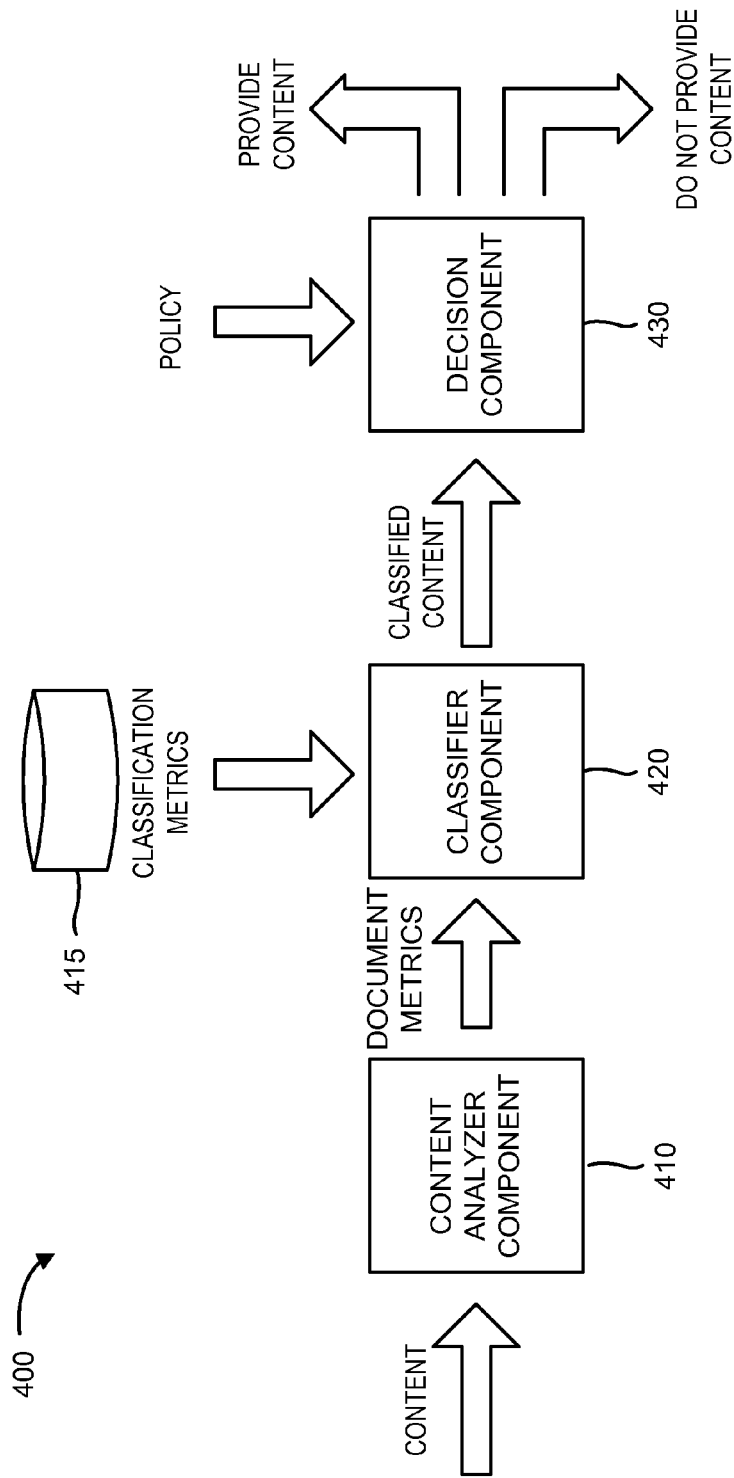
FIG. 4 is a diagram of example functional components of one or more of the nodes of FIG. 1.

FIG. 4 is a diagram of example functional components 400 of one or more of the nodes 110. As shown in FIG. 4, functional components 400 may include a collection of functional components, such as a content analyzer component 410, storage component 415, a classifier component 420, and a decision component 430. The quantity of functional components included within functional components 400 is provided for explanatory purposes. In other implementations, there may be fewer functional components, additional functional components, different functional components, or differently arranged functional components than are included within functional components 400.

Content analyzer component 410 may analyze content associated with packets obtained from traffic and/or may analyze content associated with documents that are identified by the packets (e.g., based on a URL, etc.). For example, content analyzer component 410 may analyze content that is stored within a packet (e.g., a packet payload, header, trailer, label, etc.), obtained from traffic being processed by node 110. Content analyzer component 410 may, for example, identify a source and/or destination address (e.g., a URL, a URI, an IP address, a MAC address, etc.) included within the packet. Content analyzer component 410 may also, or alternatively, identify a flow and/or application with which the traffic is associated based on information obtained from the packet (e.g., an application identifier, an application signature, an APN, a PDN identifier, etc.). Content analyzer 410 may also, or alternatively, identify a script, programming code, an executable file, etc. within the content. Also, or alternatively, content analyzer component 410 may generate a signature (e.g., based on a string of characters and/or values), associated with the content, using a hash function and/or some other mathematical function.

Additionally, or alternatively, content analyzer component 410 may analyze content within a document, pre-fetched from content server 140, identified within the packet (e.g., based on a URL, an IP address, etc.). Additionally, or alternatively, content analyzer component 410 may analyze content associated with a message (e.g., an email message, an instant message, etc.) obtained from a payload portion and/or some other portion of packets obtained from the traffic. Content analyzer component 410 may, for example, analyze the content, such as text (e.g., terms, phrases, captions, etc.), images (e.g., image data, tags, etc.), videos (e.g., video data, tags, etc.), links (e.g., URLs, etc.), metadata, etc., associated with the document or message. Content analyzer component 410 may process the analyzed content to identify one or more file types associated with the content (e.g., text, images, video, etc.), quantities of occurrence associated with terms, phrases, etc., a size associated with the files, proportions of the content associated with text, images, etc. Content analyzer component 410 may also identify resource utilization (e.g., a quantity of bandwidth, a data rate, etc.) associated with a flow of traffic and/or an application identified by the traffic.

Content analyzer component 410 may analyze the pre-determined content obtained from application server 130. The pre-determined content may correspond to respective documents that correspond to one or more categories. Content analyzer component 410 may identify respective attributes for each of the categories, based on analyzing the respective documents that corresponds to the categories. Content analyzer component 410 may associate the respective attributes with each of the categories, which may allow classifier component 420 to classify content based on the attributes and the associated with categories.

Storage component 415 may store classification metrics to be used to classify content analyzed by content analyzer component 410. Storage component 415 may also, or alternatively, store sets of content that are used to train classifier component 420. In one example, storage component 415 may store a list of categories and may store the sets of content in a manner that corresponds to a respective one or more categories within the list of categories. Storage component 415 may also, or alternatively, store a compressed version of the content (e.g., as content signatures), associated with the sets of content, as a string of characters and/or values (e.g., a hash string of characters and/or values or some other compressed or encoded version of the content) so that the content takes up less memory space. Storage component 415 may also, or alternatively, store policy information that identifies a manner in which traffic is to be processed, by node 110, based on a category assigned to the content.

Classifier component 420 may assign one or more categories to the analyzed content. In one implementation, classifier component 420 may assign a category to the analyzed content by looking up one or more categories in memory, such as storage component 415, a table, or the like. For example, classifier component 420 may identify a category from an entry, within a list of categories, corresponding to content, within storage component 415, that matches all or a portion of the analyzed content.

Classifier component 420 may, in another implementation, use one or more classification techniques to assign a category to the analyzed content based on classification metrics stored within storage component 415. One technique may use information within, or associated with, the document and/or message (e.g., a quantity of occurrences of a key term and/or phrase, a particular image and/or video, etc.) to determine the category for the analyzed content based on the classification metrics. Another technique may use information regarding an address associated with the analyzed content (e.g., a URL, URI, IP address, etc.) to determine the category for the analyzed content. For example, this technique may compare the address to a list of addresses included within the classification metrics. When the address matches an address in the list, the analyzed content may be assigned a particular category that is identified, in the list, as associated with the address.

Alternatively, or additionally, classifier component 420 may analyze the address to determine whether the address matches a pattern of addresses associated with content that is assigned to a particular category. In performing this analysis, classifier component 420 may use a regular expression. For a websites category or a message category, for example, the addresses may match a regular expression of *.com, where "*" represents any character or symbol. Yet another technique may use information regarding a type of content, such as a file type, to identify the category to assign to the analyzed content. For example, the file type may correspond to an executable file, a script, programming code, etc. Content analyzer 420 may assign a legitimate application category or a non-legitimate application category based on the file type, script, programming code, etc. A further technique may use a combination of the above-identified techniques and/or another technique to assign a category to the analyzed content.

In a further implementation, classifier component 420 may use a combination of the above-identified processes to assign categories to the analyzed content. For example, classifier component 420 may assign categories by looking up the categories from the list of categories, in the storage component 415, to the analyzed content. Classifier component 420 may also, or alternatively, assign categories to other analyzed content using the one or more classification techniques. In this implementation, classifier component 420 may look up a category, from the list of categories, to assign to the analyzed content if storage component 415 stores a category that corresponds to the analyzed content. Otherwise, classifier component 420 may use a classification technique to determine a category for the analyzed content based on the classification metrics.

Decision component 430 may identify a manner in which traffic is to be processed, by node 110, based on a classification of the content. Decision component 430 may, for example, use policy information to identify one or more ways to process traffic based on which category is assigned to the traffic. In one example, the policy information may indicate that a content filtering operation is to be performed on traffic (e.g., by dropping packets, not processing packets, etc.) that is assigned to a first category (e.g., associated with malicious software, malware, etc.). Additionally, or alternatively, the policy information may indicate that a website filtering operation is to be performed on the traffic (e.g., by blocking access to a website, by not rendering a web page, etc.) that is assigned to a second category (e.g., associated with blacklisted or unauthorized address, such as a URL, URI, etc.).

Additionally, or alternatively, the policy information may indicate that a DLP operation is to be performed on traffic (e.g., by preventing traffic being transmitted to a destination) that is assigned to a third category (e.g., associated with unauthorized and/or confidential information, an unauthorized destination address, etc.). Additionally, or alternatively, the policy information may indicate that an anti-spam operation is to be performed on the traffic (e.g., by preventing a message from being processed, transmitted, etc.) that is assigned to a fourth category (e.g., associated with a type of content and/or source address suspected of being associated with spam or unauthorized content). Additionally or alternatively, the policy information may indicate that a level of QoS (e.g., forwarding priority, a quantity of bandwidth, etc.) is to be adjusted when processing traffic that has been assigned a fifth category.

Figure 5:
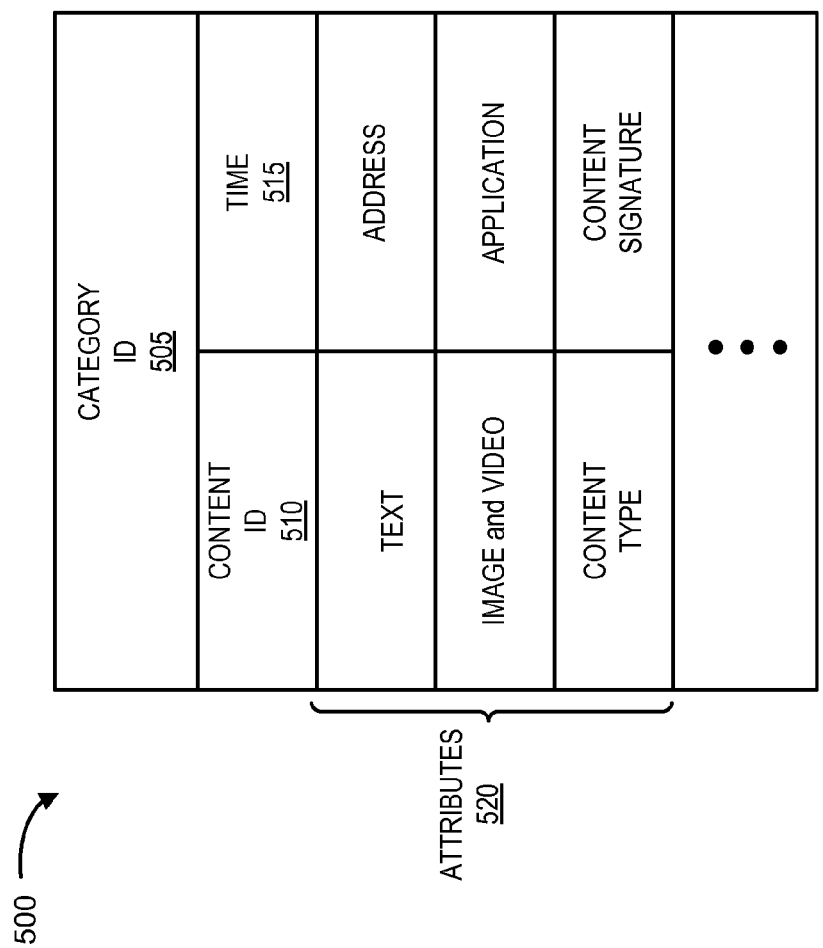
FIG. 5 is a diagram of an example data structure that stores classification metrics.

FIG. 5 is a diagram of an example data structure 500 that stores classification metrics. Data structure 500 may be stored in a memory and/or storage device associated with node 110 (e.g., storage component 415 of FIG. 4). As shown in FIG. 5, data structure 500 may include a collection of fields, such as a category identifier (ID) field 505, a content ID field 510, a time field 515, and a group of attributes fields 520. The quantity of fields in data structure 500 is included for explanatory purposes. In practice, data structure 500 may include additional fields, fewer fields, or different fields than are provided with respect to data structure 500.

Category ID field 505 may identify a particular category with which classification metrics, stored in data structure 500, are associated. Examples of categories, that may be identified by category ID field 505, include authorized and/or unauthorized subject matter categories (e.g., messages, documents, or web pages related to news, sports, politics, adult content, violence, etc.), authorized and/or unauthorized message categories (e.g., authorized messages, spam, unsubscribed-to messages, etc.), authorized and/or unauthorized address categories (e.g., approved and/or blocked URLs, IP addresses, URIs, etc.), authorized and/or unauthorized application categories (e.g., approved and/or blocked application IDs, APNs, etc.), content type categories (e.g., text, images, video, executable software, etc.), authorized and/or unauthorized users (e.g., associated with client device 120), etc.

Content ID field 510 may identify sources of content from which the classification metrics, associated with the particular category, are based. The sources of content may identify on which packets, documents, web pages, etc. the classification metrics are based.

Time field 515 may identify a time at which the classification metrics, associated with the particular category, were generated. The time may allow application server 130 and/or node 110 to obtain updated classification metrics when a period of time between the time and another time (e.g., current time or some other point in time) is greater than a threshold.

Attributes field 520 may identify attributes, obtained from the identified sources of content, that correspond to the particular category. For example, attributes field 520 may include a text field that identifies one or more key terms or phrases, included within a document, message, web page, etc. that correspond to the particular category. Additionally, or alternatively, the text field may identify a threshold that corresponds to a respective quantity of times that each key term and/or phrase is to be included within the document, message, and/or web page to qualify for the particular category. Additionally, or alternatively, the text field may identify a threshold that corresponds to a respective density of a key term and/or phrase based on the respective quantity of times each key term and/or phrase appears in the document, message, and/or web page relative to all of the terms and/or phrases included within the document.

Attributes field 520 may also, or alternatively, include an image and video field that identifies one or more images and/or videos, included within a document, message, web page, etc. that correspond to the particular category. For example, the image and/or video may be identified based on an image tag, image content, a video tag, video content, etc. The images and/or videos may, for example, correspond to images or videos that are authorized or not authorized by a policy associated with node 110, network 150 and/or client device 120.

Attributes field 520 may also, or alternatively, include an address field that identifies one or more source and/or destination addresses (e.g., a URL, a URI, an IP address, a MAC address, etc.) associated with traffic, being processed by node 110, that correspond to the particular category. The source and/or destination addresses may correspond to addresses that are authorized (e.g., white listed addresses) or not authorized (e.g., black listed addresses or addresses that are to be blocked, etc.) by the policy.

Attributes field 520 may also, or alternatively, include an application field that identifies one or more traffic flows and/or applications associated with traffic, being processed by node 110, that correspond to the particular category. For example, the application field may store information associated with the application (e.g., an application identifier, an application signature, an application name, an application vendor, an APN, a PDN identifier, etc.) obtained from one or more packets within the traffic. The traffic flows and/or application addresses may correspond to traffic flows and/or applications that are authorized or not authorized by the policy. The application field may also, or alternatively, store information associated with respective resources used by the traffic flows and/or applications.

Attribute field 520 may also, or alternatively, include a content type field that identifies one or more types of content associated with traffic, being processed by node 110, that correspond to the particular category. For example, the content type field may store information associated with a type of content identified within the traffic. The type of content may, for example, correspond to web traffic (e.g., social networking, web pages, etc.) and/or message traffic (e.g., email, instant message, etc.), a type of file, etc. The type of file may be associated with an image (e.g., an image file), video content (e.g., a video file), text (e.g., a text file), executable software (e.g., a script, programming code, etc.), and/or some other type of file. The type of content may correspond to types of content and/or files that are authorized or not authorized by the policy.

Attribute field 520 may also, or alternatively, include a content signature field that stores signatures associated with content that corresponds to the particular category. The signatures may be generated based on content obtained from packets associated with the traffic and/or pre-fetched content (e.g., documents, web pages, etc.) based on URLs obtained from the packets. The signatures may, for example, be generated based on the content using a hash function and/or some other mathematical algorithm to generate a string of characters and/or values that represent the content. The signature may be stored within an amount of memory that is less than an amount of memory needed to store the actual content. In one example, the signatures may correspond to content that is known to be unauthorized, such as spam, malicious software, etc.

Figure 6:
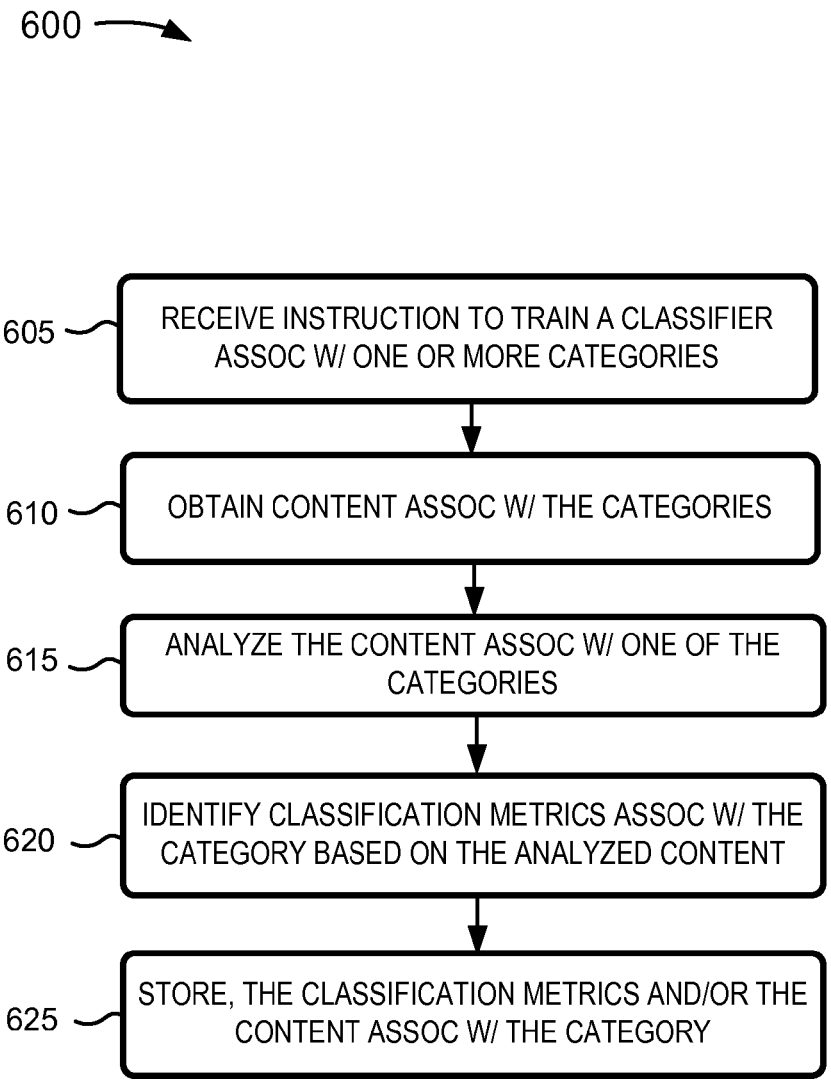
FIG. 6 is a flow chart of an example process for training a classifier for processing traffic by a node.

FIG. 6 is a flow chart of an example process 600 for training a classifier for processing traffic by node 110. In one example implementation, process 600 may be performed by node 110. In another example implementation, some or all of process 600 may be performed by a device or collection of devices separate from, or in combination with, node 110.

As shown in FIG. 6, process 600 may include receiving an instruction to train a classifier associated with one or more categories (block 605) and obtaining content associated with the categories (block 610). For example, node 110 may receive, from a network administrator associated with a network (e.g., network 150), an instruction to train a classifier associated with node 110. Node 110 may, in response to the instruction, communicate with application server 130 to obtain a collection of content, associated with one or more categories, to be used to train the classifier. The collection of content may include content that is predetermined to be associated with one or more categories. The content may include information obtained from packets associated with different flows of traffic and/or web pages obtained from content server 140 based on an address (e.g., an URL) included within one or more of the packets.

As also shown in FIG. 6, process 600 may include analyzing the content associated with one of the categories (block 615) and identifying classification metrics associated with the category based on the analyzed content (block 620). For example, node 110 may analyze the content, associated with one of the categories, to identify attributes that correspond to the category.

Node 110 may, for example, analyze text associated with a message included within the packets (e.g., an email message, an instant message) and/or a document or web page obtained from content server 140 to identify text attributes associated with the category. Node 110 may also, or alternatively, identify terms and/or phrases within the content and may associate the terms and/or phrases with the category. Node 110 may also, or alternatively, identify a quantity of times that the terms and/or phrases occur within the content and may associate a text threshold with the category, based on the quantity of times that the terms and/or phrases occur within the content. Node 110 may also identify images and/or video content that are included within the content to identify image and/or video attributes associated with the category. Node 110 may associate the identified image and/or video attributes with the category.

Additionally, or alternatively, node 110 may analyze the packets, associated with the content, to identify flow and/or application attributes to be associated with the category. The flow and/or application attributes may be based on information associated with the flow and/or the application (e.g., an application identifier, an application signature, an application name, an APN, a PDN identifier, etc.) included within the packets. Node 110 may also, or alternatively, and based on analyzing the packets, identify address attributes to be associated with the category. The address attributes may be based on a source and/or destination address (e.g., an IP address, a URL, a URI, a MAC address, etc.), included within the packets.

Node 110 may also, or alternatively, identify traffic type attributes to be associated with the category. The traffic type attributes may be based on a type of traffic associated with the content, such as a type of message (e.g., email, instant message, etc.), Internet traffic (e.g., a web page, etc.), a type of file, etc. Node 110 may generate a content signature based on the content that corresponds to the category. Node 110 may, for example, generate the content signature using a hash function and/or some other mathematical algorithm and may associate the content signature with the category.

As further shown in FIG. 6, process 600 may include storing the classification metrics and/or the content associated with the category (block 625). Node 110 may store, in a memory associated with node 110, the content associated with the category and the classification metrics associated with the category. The classification metrics may be based on the attributes, identified by node 110, as a result of analyzing the content, associated with the category.

Node 110 may, in a manner similar to that described above, analyze content associated with each of the categories to generate classification metrics associated with each of the categories. Node 110 may store, in the memory, the content associated with each of the categories and the classification metrics associated with each of the categories.

Figure 7:
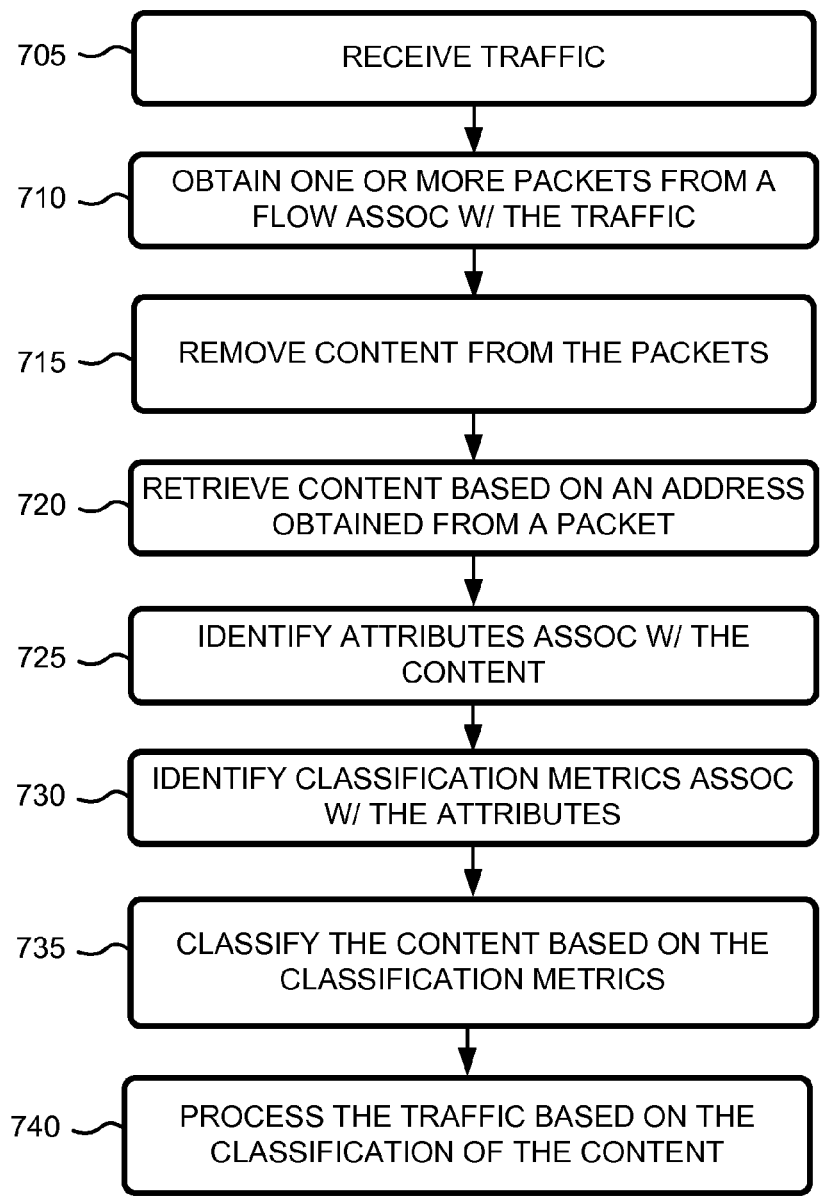
FIG. 7 is a flow chart of an example process for classifying traffic being processed by a node.

FIG. 7 is a flow chart of an example process 700 for classifying traffic being processed by node 110. In one example implementation, process 700 may be performed by node 110. In another example implementation, some or all of process 700 may be performed by a device or collection of devices separate from, or in combination with, node 110.

As shown in FIG. 7, process 700 may include receiving traffic (block 705) and obtaining one or more packets from a flow associated with the traffic (block 710). For example, node 110 may receive traffic being transported via network 150. Node 110 may obtain, from the traffic, one or more packets, associated with a flow within the traffic. Node 110 may remove labels, headers, trailers, payloads, etc. from the packets so that node 110 can access and/or analyze information stored within the packets.

As also shown in FIG. 7, process 700 may include removing content from the packets (block 715) and obtaining content based on an address obtained from a packet (block 720). For example, node 110 may remove content that is stored within one or more portions of the packets. Node 110 may, for example, remove one or more network addresses, information associated with an application and/or flow, information associated with one or more files, information associated with text, one or more images and/or video, links, etc.

Node 110 may also, or alternatively, retrieve content from content server 140 based on information included within content removed from the packets. Node 110 may, for example, access a web site, hosted by content server 140, using an address (e.g., a URL) obtained from the packets. Node 110 may retrieve content, such as a document, a web page, streaming media, etc., from the web site.

As further shown in FIG. 7, process 700 may include identifying attributes associated with the content (block 725) and identifying classification metrics associated with the attributes (block 730). For example, node 110 may analyze the content, removed from the packets and/or retrieved from content server 140, to identify attributes, associated with the content. Node 110 may, for example, identify an address attribute based on one or more source and/or destination addresses (e.g., IP addresses, URLs, URIs, MAC addresses, etc.) identified within the content removed from the packets. Node 110 may also, or alternatively, identify an application attribute based on information associated with an application and/or flow (e.g., an application identifier, an application name, an application signature, an APN, a PDN identifier, etc.) identified within the content removed from the packets. Node 110 may also, or alternatively, identify a content type attribute based on information associated with a type of content (e.g., social networking traffic, video traffic, a file identifier, a file extension, etc.) identified within the content removed from the packets.

Node 110 may identify text attributes based on textual content within message content (e.g., an email message, an instant message, etc.) included within the content removed from the packets and/or within a document, web page, etc. retrieved from content server 140. The text attributes may, for example, identify one or more terms, phrases, captions, etc. included within the message, document, web page, etc. and/or a quantity of times that the terms, phrases, or captions appear within the message, document, web page, etc. Additionally, or alternatively, node 110 may identify an image and/or video attribute based on image content (e.g., image tag, image data, etc.) and/or video content (e.g., a video tag, video data, etc.) included within the message, document, web page, etc.

Node 110 may also, or alternatively, generate a content signature associated with content removed from the packets and/or retrieved from content server 140. The content signature may be represented by a string of characters and/or values that are generated using a hash function or some other mathematical algorithm.

As further shown in FIG. 7, process 700 may include identifying classification metrics associated with the attributes (block 730) and classifying the content based on the classification metrics (block 735). For example, node 110 may determine whether the content signature, associated with the content, is included within a list of content signatures stored within a memory associated with node 110 (e.g., storage component 415 of FIG. 4). Node 110 may, for example, determine that the content signature is included within the list of content signatures and may identify a category (e.g., a malicious software category, a spam category, trusted content category, etc.) that corresponds to the content signature within the list of content signatures. Node 110 may associate the category with the content based on the determination that the content signature is included within the list of content signatures. Node 110 may classify the content based on the category with which the content is associated.

Additionally, or alternatively, node 110 may determine that one or more terms and/or phrases, identified by the text attribute, match one or more terms and/or phrases associated with one or more first classification metrics. The first classification metrics may be stored among a collection of classification metrics within the memory. Node 110 may assign one or more categories (e.g., news category, sports category, violence category, etc.), associated with the one or more first classification metrics, to the content. Additionally, or alternatively, node 110 may assign one or more first values to the one or more categories based on a quantity of the one or more terms and/or phrases that match the one or more terms and/or phrases associated with the first classification metrics. Node 110 may, for example, assign a highest first value to a category associated with first classification metrics that include a greatest quantity of terms and/or phrases that match the terms and/or phrases identified by the text attribute. Node 110 may assign a next-highest first value to another category associated with other first classification metrics that include a next-greatest quantity of terms and/or phrases that match the terms and/or phrases identified by the text attribute. Node 110 may also, or alternatively, rank the categories associated with the text content (e.g., a text-based ranking (TR)), based on the assigned values, where a first (or top) ranked category may correspond to the highest assigned first value, a second (or next-to-top) ranked category may correspond to the next-highest assigned first value, and so on.

Additionally, or alternatively, node 110 may determine that image and/or video content (e.g., image tags, image data, video tags, video data, etc.), identified by the image and/or video attribute, match image and/or video content associated with one or more second classification metrics stored within the memory. Node 110 may also, or alternatively, assign one or more categories (e.g., adult content category, sports category, news category, etc.), associated with the second metrics, to the content. Additionally, or alternatively, node 110 may, in a manner similar to that described above, assign second values to the categories based on quantities of image and/or video content that match the image and/or video content associated with the second classification metrics. Node 110 may also, or alternatively, rank the categories associated with to the image and/or video content (e.g., an image and/or video-based ranking (IR)), based on the assigned second values, where a first (or top) ranked category may correspond to the highest assigned second value, a second (or next-to-top) ranked category may correspond to the next-highest assigned second value, and so on.

Additionally, or alternatively, node 110 may determine that one or more network addresses (e.g., IP address, URL, URI, MAC address, etc.), such as source addresses, destination address, etc., identified by the address attribute, match one or more network addresses associated with third classification metrics stored within the memory. Node 110 may also, or alternatively, assign one or more categories (e.g., a spam category, a social media category, a non-trusted website category, etc.), associated with the third metrics, to the content. Additionally, or alternatively, node 110 may, in a manner similar to that described above, assign third values to the categories based on quantities of the one or more network addresses that match the one or more network addresses associated with the third classification metrics. Node 110 may, in a manner similar to that described above, rank the categories associated with to the network address-based content (e.g., a network address-based ranking (NAR)), based on the assigned third values.

Additionally, or alternatively, node 110 may determine that information associated with an application and/or traffic flow (e.g., based on an application identifier, application name, application signature, APN, PDN identifier, etc.), identified by the application attribute, matches information associated with an application and/or traffic flow associated with one or more fourth classification metrics stored within the memory. Node 110 may also, or alternatively, assign one or more categories (e.g., a malicious software category, a resource utilization category, a legitimate application category, a non-legitimate application category, etc.), associated with the fourth classification metrics, to the content. Additionally, or alternatively, node 110 may, in a manner similar to that described above, assign fourth values to the categories based on respective quantities of application identifiers, application names, APNs, etc. that match one or more application identifiers, application names, APNs, etc. associated with the fourth classification metrics. Node 110 may in a manner similar to that described above, rank the categories associated with to the application and/or traffic flow-based content (e.g., an application-based ranking (AR)), based on the assigned fourth values.

Additionally, or alternatively, node 110 may determine that information associated with one or more types of content (e.g., based on a type of file, a type of data, etc.), identified by the content type attribute, matches information associated with one or more types of content associated with fifth classification metrics stored within the memory. Node 110 may also, or alternatively, assign one or more categories (e.g., adult content category, news category, sports category, etc.), associated with the fifth classification metrics, to the content. Additionally, or alternatively, node 110 may, in a manner similar to that described above, assign fifth values to the categories based on respective quantities of types of content that match one or more types of content associated with the fifth classification metrics. Node 110 may in a manner similar to that described above, rank the categories associated with to the type of content-based content (e.g., an content-based ranking (CR)), based on the assigned fifth values.

Node 110 may also, or alternatively, classify the content based on one or more of the categories assigned to the content. For a particular category, node 110 may, for example, identify a category score (e.g., and CS) based on an aggregate ranking associated with the particular category. The aggregate ranking, associated with the particular category, may be based on the text-based ranking (e.g., TR), the image and/or video-based ranking (e.g., IR), the network address-based ranking (e.g., NAR), the application-based ranking (e.g., AR), and/or the content-based ranking (e.g., CR) (e.g., where $CS \cong =TR+IR+NAR+AR+CR$). Node 110 may generate a category score for each of the categories assigned to the content and may select a category with the lowest category score (e.g., a highest aggregate ranking) Node 110 may classify the content based on the selected category.

In another example, node 110 may generate the category score, for the particular category, based on a weighted combination of the text-based ranking, the image and/or video-based ranking, the network address-based ranking, the application-based ranking, and/or the content-based ranking Node 110 may, for example, generate the category score using weighting factors (e.g., W1, W2, W3, W4, and W5) that are predetermined by node 110 and/or by an network administrator associated with network 150. Each weighting factor may be between zero and a threshold (e.g., $0 \le W \le 1$) and/or a sum of the weighting factors may be approximately equal to another threshold (e.g., where $W1+W2+W3+W4+W5 \cong =1$). Node 110 may assign a respective, different weighting factor to the text-based ranking, the image and/or video-based ranking, the network address-based ranking, the application-based ranking, and/or the content-based ranking to control a manner in which each of the rankings contribute to the category score (e.g., where $CS \cong =W1*TR+W2*IR+W3*NAR+W4*AR+W5*CR$).

In one example, the category score may be determined when each of the weighting factors are approximately equal (e.g., where $CS \cong =0.2*TR+0.2*IR+0.2*NAR+0.2*AR+0.2*CR$). In this case, twenty percent (0.2) of each ranking contributes to the category score. In another example, the category score may be determined when each of the weighting factors are not equal (e.g., where $CS \cong =0.2*TR+0.3*IR+0.4*NAR+0.1*AR+0.0*CR$). In this case, the category score may be based twenty percent (0.2) on the text-based ranking, thirty percent (0.3) on the image and/or video-based ranking, forty percent (0.4) on the network address-based ranking, ten percent (0.1) on the application and traffic flow-based ranking, and zero percent (0.0) on the content type-based ranking.

Node 110 may generate a category score, based on a weighted average, for each of the categories assigned to the content and may select a category with the lowest category score (e.g., a lowest weighted average). Node 110 may classify the content based on the selected category. In another example, if node 110 determines that any of the categories associated with the content are associated with malicious software, malware, a virus, etc., then node 110 may classify the content based on the category associated with the malicious software, malware, virus, etc. without generating the category score.

As still further shown in FIG. 7, process 700 may include processing the content based on the classification of the content (block 740). For example, node 110 may obtain policy information as a result of classifying the traffic. The policy information may identify a manner in which the traffic is to be processed based on the classification of the content. Node 110 may, for example, drop the traffic, ignore the traffic, or otherwise not process the traffic when the policy information, associated with the classification, indicates that the traffic is to be dropped, ignored, or otherwise not processed. In another example, node 110 may forward the traffic to a destination address when the policy information, associated with the classification, indicates that the traffic is to be forwarded to the destination address. Processing the traffic, based on the classification of the content, will be described in greater detail below with respect to FIG. 8.

Figure 8:
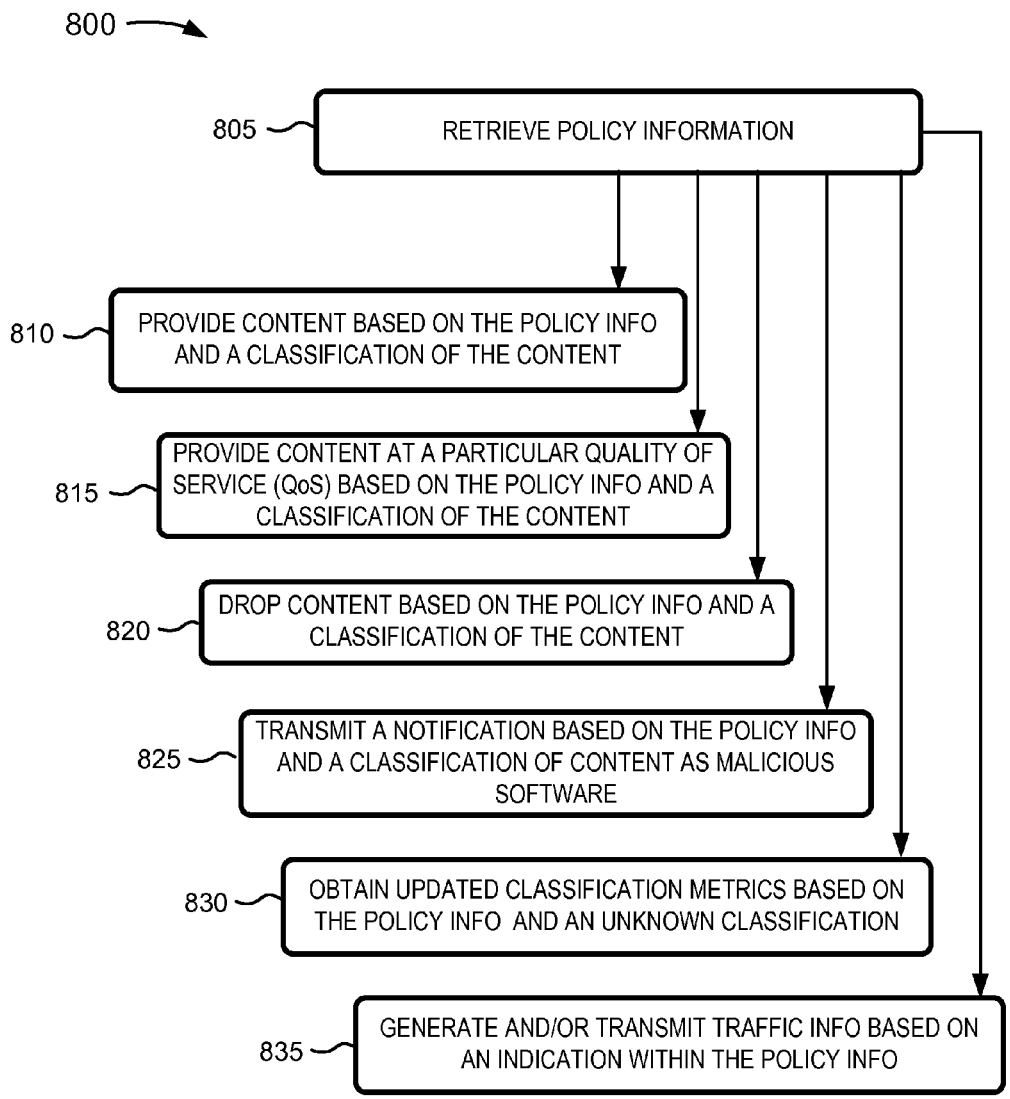
FIG. 8 is a flow chart of an example process for processing traffic based on a classification associated with the traffic.

FIG. 8 is a flow chart of an example process 800 for processing traffic based on a classification associated with the traffic. Process 800 may be associated with block 740 of FIG. 7. In one example implementation, process 800 may be performed by node 110. In another example implementation, some or all of process 800 may be performed by a device or collection of devices separate from, or in combination with, node 110.

As shown in FIG. 8, process 800 may include retrieving policy information (block 805) and providing content based on the policy information and a classification of the content (block 810). For example, node 110 may retrieve, from a memory associated with node 110, policy information associated with a classification of content obtained from traffic being processed by node 110 and/or obtained from content server 140 based on a URL obtained from the traffic. In one example, the content may include a web page, a document, a message (e.g., an email message, instant message, etc.) an image, video content, etc. Node 110 may determine that the policy information indicates that the content is to be forwarded to a destination device (e.g., client device 120) when the classification indicates that the content is authorized content (e.g., news, sports, pictures, movies, etc.).

As also shown in FIG. 8, process 800 may include providing content based on the policy information and a classification of the content (block 815). In one example, the content may include a web page, a document, a message (e.g., an email message, instant message, etc.) an image, video content, etc. Node 110 may determine that the policy information indicates that the content is to be forwarded to a destination device (e.g., client device 120) when the classification indicates that the content is authorized content (e.g., news, sports, pictures, movies, etc.). Node 110 may also, or alternatively, determine that the policy information identifies a respective QoS depending on a type of content. For example, if the type of content corresponds to streaming media, then node 110 may forward the content at a first QoS. If the type of content corresponds to web traffic or a file download (e.g., based on a file transfer protocol (FTP)), then node 110 may forward the traffic at a second QoS. The first QoS may, for example, correspond to a priority and/or bandwidth allocation that is greater than a priority and/or bandwidth allocation associated with the second QoS. Node 110 may also, or alternatively, determine that traffic, associated with a particular application and/or flow, is to be provided at a particular QoS and/or using a quantity of resources (e.g., bandwidth, a data rate, etc.), when the classification indicates that the content is associated with the particular application and/or flow.

As further shown in FIG. 8, process 800 may include dropping content based on the policy information and a classification of the content (block 820). For example, node 110 may determine that the policy information indicates that the content is to be dropped, ignored, or otherwise not processed when the classification indicates that the content includes an unauthorized network address. The unauthorized network address may correspond to an address known to be a source of malicious software, electronic attacks (e.g., phishing attacks, denial of service attacks, etc.), spam, etc. Additionally, or alternatively, the unauthorized network address may correspond to a network address associated with an unauthorized website (e.g., a social networking website, a website associated with adult content, etc.).

As yet further shown in FIG. 8, process 800 may include transmitting a notification based on the policy information and a classification of content as malicious software (block 825). For example, node 110 may determine that the policy information indicates that a notification is to be transmitted when a classification, associated with content, indicates that the content is associated with malicious software. Node 110 may, in one example, drop, ignore, or otherwise not process the content when the classification indicates that the content is associated with malicious software. Additionally, or alternatively, node 110 may transmit, to application server 130 and/or another node 110, a notification indicating that content, associated with malicious software, has been detected. The notification may include information associated with the content, such as a file identifier (e.g., a filename, etc), a content signature of the malicious software, a network address from which the malicious software was transmitted, an application identifier associated with the malicious software, etc.

Transmitting the notification may enable the other node 110 to update and/or train a classifier to process the content associated with the malicious software if the classifier is not already updated and/or trained to identify and/or properly classify the content. Transmitting the notification to application server 130 may enable application server 130 to update the content repository to include the content associated with the malicious software and/or to transmit (e.g., push) another notification to further nodes 110 to allow the further nodes 110 to update and/or train classifiers associated with the further nodes 110.

As also shown in FIG. 8, process 800 may include obtaining updated classification metrics based on the policy information and an unknown classification (block 830). For example, node 110 may communicate with application server 130 to retrieve updated classification metrics based on an unknown classification. The unknown classification may be determined, by node 110, when content, obtained from the traffic and/or retrieved from content server 140, does not match content associated with the classification metrics. For example, if a content signature associated with traffic does not match a content signature associated with any classification metrics, node 110 may classify the content as an unknown classification. Additionally, or alternatively, if a network address and/or application identifier obtained from the content does not match a network address and/or application identifier associated with any classification metrics, node 110 may classify the content as an unknown classification.

Node 110 may determine that the policy information indicates that updated classification metrics are to be obtained when content is classified as an unknown classification. Node 110 may, for example, communicate with application server 130 to obtain updated classification metrics to be used to train a classifier associated with node 110. Node 110 may transmit information corresponding to the content with the unknown classification. Application server 130 may receive the information, corresponding to the content, which may allow an operator of application server 130 to obtain additional information associated with the content and/or to identify a category to be assigned to the content. Application server 130 may push classification metrics, associated with the content, to node 110 and/or other nodes 110, to be used to train classifiers associated with node 110 and/or the other nodes 110.

As further shown in FIG. 8, process 800 may include generating and/or transmitting traffic information based on an indication within the policy information (block 835). For example, node 110 may generate traffic information associated with traffic processed, by node 110, over a period of time. The traffic information may identify types of applications, traffic flows, files, etc. processed by node 110 over the period of time. The traffic information may also, or alternatively, identify malicious software, spam, untrustworthy network addresses, etc. processed by node 110 over the period of time. The traffic information may also, or alternatively, identify categories assigned to traffic and/or classifications associated with traffic over the period of time. Node 110 may transmit the traffic information to application server 130, which may enable application server 130 to identify patterns and/or trends associated with traffic processed by node 110 over the period of time. Application server 130 may also, or alternatively, combine the traffic information with other traffic information, received from other nodes 110, to identify aggregate patterns and/or trends associated with traffic being processed by nodes 110 within network 150.

Additionally, or alternatively, node 110 may transmit, as particular traffic information, content (e.g. obtained from packets within traffic), attributes associated with the content, and/or information associated with how node 110 classified the content to application 130 and/or another node 110. Transmitting the particular traffic information may enable application server 130 to update the content repository (e.g., that stores pre-determined content), update a classifier to assign categories to the update pre-determined content, and/or transmit all or a portion of the particular traffic information to other node 110. Node 110 may update a classifier, associated with node 110, based on the particular traffic information and/or may transmit the particular traffic information to the other node 110 which may allow the other node 110 to update a classifier, associated with other node 110, based on the particular traffic information. Node 110 may transmit the particular traffic information based on a time interval (e.g., every 12 hours, 24 hours, weekly, etc.), during a time period (e.g., non-peak hours, etc.), and/or upon the occurrence of some event (e.g., detection of malicious software, when powering up, etc.). In one example, node 110 may publish the particular traffic information (e.g., as a web service, a data service, via a web page, etc.), which may be obtained, by application server 130 and/or the other node 110 that have subscribed to receive the particular traffic information.

A system and/or method, described herein, may enable a node to train a classifier based on predetermined content associated with one or more categories. The node may analyze the predetermined content to identify unique attributes that correspond to each category of content and may generate classification metrics based on the attributes. The classification metrics may be used to train the classifier so that content, obtained from traffic being processed by the node, can be classified without communicating with a third party service provider to obtain classification services.

Classifying the content may enable the node to process the traffic, based on the classification of the content, in a manner that conforms to policy information associated with a network. Classifying the traffic and/or content may allow the node to provide services, such as website filtering, content filtering, DLP, anti-spam processing, malicious software identification, etc., without communicating with a third party service provider to classify the traffic and/or provide the services.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a node, traffic being transported via a network;
   obtaining, by the node and as a result of receiving the traffic, content from one or more packets associated with the traffic;
   analyzing, by the node, the content to identify one or more attributes associated with the content,
      the one or more attributes corresponding to at least one of:
         a network address,
         information associated with an application or service,
         information associated with message content, or
         information associated with software content;
   determining, by the node, that an attribute, of the one or more attributes, matches one or more particular attributes associated with one or more categories of a plurality of categories of traffic;
   determining, by the node, a ranking for the one or more categories based on quantities of the one or more particular attributes that match the attribute;
   identifying, by the node, a category, of the plurality of categories, based on the ranking;
   associating, by the node, the category and the traffic; and
   processing, by the node, the traffic based on the associated category.

2. The method of claim 1, where processing the traffic comprises:
   retrieving policy information associated with the network;
   determining that the policy information indicates that the traffic is to be processed in a particular manner when the category is associated with the traffic; and
   processing the traffic in the particular manner based on the category being associated with the traffic.

3. The method of claim 1, where processing the traffic includes one or more of:
   performing web filtering when the network address corresponds to a uniform resource locator associated with a website that is not authorized by a policy associated with the network,
      the web filtering precluding the website from being accessed;
   performing content filtering when the information associated with the message content includes a quantity of one or more terms, not authorized by the policy, that is greater than a threshold,
      the content filtering precluding the content from being forwarded to a client device; or performing spam filtering when a content signature, associated with the content, matches a content signature that is associated with content known to be associated with spam, the spam filtering precluding the content from being forwarded to the client device.

4. The method of claim 1, where analyzing the content comprises:

determining that the content includes another network address associated with a server device;

communicating, with the server device and by using the other network address, to obtain a document or a web page;

associating the document or the web page with the content; and analyzing the content, with which the document or the web page is associated, to identify the one or more attributes associated with the content.

5. The method of claim 1, where analyzing the content includes at least one of:

detecting the network address based on an Internet protocol (IP) address, a uniform resource locator (URL), a uniform resource identifier (URI), or a media access control (MAC) address within the content;

detecting the information associated with the application or service based on an identifier associated with the application, an access point name (APN), or a packet data network (PDN) identifier within the content;

detecting the information associated with the message content based on one or more terms, phrases, images, or videos within the content; or detecting the software content based on a script or programming code within the content.

6. The method of claim 1, where the attribute is a first attribute, where the one or more categories are one or more first categories, and where determining the ranking includes:

assigning first scores to the one or more first categories based on the quantities of the one or more particular attributes that match the first attribute;

determining that a second attribute, of the one or more attributes, matches other attributes associated with one or more second categories of the plurality of categories;

assigning second scores to the one or more second categories based on quantities of the other attributes that match the second attribute;

determining third scores for categories associated with the one or more first categories and the one or more second categories based on the first scores and the second scores; and determining the ranking based on the third scores for the categories.

7. The method of claim 1, further comprising:

receiving an instruction to train a classifier associated with the node;

obtaining, based on the instruction, predetermined content associated with the plurality of categories;

analyzing the predetermined content associated with the plurality of categories;

generating respective classification metrics associated with the plurality of categories as a result of analyzing the predetermined content, the respective classification metrics for a particular category, of the plurality of categories, identifying at least one of:

a source address associated with the particular category, a destination address associated with the particular category, an application associated with the particular category, key terms or phrases associated with the particular category, one or more images or videos associated with the particular category, or software or programming code associated with the particular category; and storing the respective classification metrics in a memory associated with the node.

8. The method of claim 7, further comprising:

identifying a first time at which the classification metrics were generated;

determining that the classification metrics have expired based on the first time relative to a second time; and obtaining other predetermined content with which to generate updated classification metrics based on determining that the classification metrics have expired.

9. A node comprising:

a memory to store classification information for a set of categories of traffic, the classification information, for a particular one of the set of categories, identifying at least one of:

a network address attribute, an application attribute associated with a flow of packets, a text, image, or video attribute, or a file attribute; and one or more processors to:

receive packets associated with traffic being transported via a network, obtain content from the packets, analyze the content to identify attributes associated with the content, identify respective classification information, for each of one or more categories, of the set of categories, that includes one or more of the attributes, rank the one or more categories based on each quantity of the one or more of the attributes included within the respective classification information, assign, to the traffic, a particular category, of the one or more categories, associated with a highest rank of the one or more categories, and process the traffic in a manner identified by a policy that indicates how the traffic is to be processed when the particular category is assigned to the traffic.

10. The node of claim 9, where the one or more processors are further to:

identify one of the attributes as a source address, determine that the source address matches an attribute associated with first classification information of the respective classification information, determine that the content is associated with spam when the first classification information corresponds to a category, of the set of categories, associated with spam, and drop the traffic based on determining that the content is associated with the spam.

11. The node of claim 9, where the one or more processors are further to:

generate a content signature based on the content, the content signature corresponding to a string of characters or values that represents the content, determine that the content signature is included within a list of content signatures that are stored in the memory, the content signature, included within the list of content signatures, corresponding to a category, of the set of categories, associated with malicious software, and drop the content based on determining that the content signature corresponds to the category associated with the malicious software.

12. The node of claim 9, where the one or more processors are further to:

identify one of the attributes as a type of file, determine that the type of file matches an attribute associated with first classification information of the respective classification information, determine that the first classification information identifies another category, of the set of categories, associated with a particular type of content within the traffic, assign, to the traffic, the other category associated with the particular type of content, and process the traffic at a quality of service (QoS) associated with a forwarding priority, relative to other forwarding priorities that are not associated with the particular type of content, based on assigning the other category, associated with the particular type of content, to the traffic.

13. The node of claim 9, where the one or more processors are further to:

identify one of the attributes as the network address attribute, determine that the network address attribute matches an attribute associated with first classification information of the respective classification information, determine that the first classification information identifies another category, of the set of categories, associated with websites where access is not authorized, and transmit a notification indicating that access to a website is not authorized based on determining that the first classification information identifies the other category associated with websites where access is not authorized.

14. The node of claim 9, where the one or more processors are to:

identify one of the attributes as the network address attribute, access a website, using the network address attribute, to obtain a web page, identify one or more terms included within text of the web page, determine that at least one term, of the one or more terms, is included within first classification information, of the respective classification information, associated with a first category of the set of categories, and within second classification information, of the respective classification information, associated with a second category of the set of categories, determine that a greater quantity of the at least one term is included within the first classification information than within the second classification information, and process the traffic in a manner that corresponds to the first category based on determining that the greater quantity of the at least one term is included within the first classification information than within the second classification information.

15. The node of claim 9, where the one or more processors are further to:

receive an instruction to train a classifier associated with the node, obtain, from a server device and based on the instruction, content associated with the set of categories, analyze the content associated with the set of categories to identify the classification information associated with the set of categories, and store the classification information in the memory.

16. A non-transitory computer-readable medium storing instructions, the instructions comprising:

one or more instructions that, when executed by at least one processor of a node, cause the at least one processor to:

identify a particular attribute associated with content;

determine that the particular attribute matches a stored attribute of a plurality of attributes that are stored within a memory of the node, the plurality of attributes corresponding to a plurality of categories of traffic;

identify classification information, for one or more categories of the plurality of categories of traffic, that corresponds to the particular attribute after determining that the particular attribute matches the stored attribute;

determine a ranking of the one or more categories based on the classification information;

identify a particular category, of the one or more categories, based on the ranking;

associate the particular category with traffic that is associated with the content; and process the traffic based on the particular category being associated with the traffic.

17. The non-transitory computer-readable medium of claim 16, where the instructions further comprise:

one or more instructions that, when executed by the at least one processor, cause the at least one processor to:

receive an instruction to train a classifier associated with the node;

obtain, based on the instruction, predetermined content associated with the plurality of categories;

generate classification information for the plurality of categories; and store the classification information in the memory.

18. The non-transitory computer-readable medium of claim 16, where the particular attribute corresponds to one or more of:

a network address, information associated with an application or service, information associated with message content, or information associated with software content.

19. The non-transitory computer-readable medium of claim 16, where the instructions further comprise:

one or more instructions that, when executed by the at least one processor, cause the at least one processor to:

receive the traffic as the traffic is being transported via a network; and obtain the content from one or more packets associated with the traffic.

20. The non-transitory computer-readable medium of claim 16, where the one or more instructions to process the traffic comprise:

one or more instructions that, when executed by the at least one processor, cause the at least one processor to:

retrieve policy information associated with a network that is associated with the traffic, determine that the policy information indicates that the traffic is to be processed in a particular manner when the category is associated with the traffic, and process the traffic in the particular manner based on the category being associated with the traffic.

21. The non-transitory computer-readable medium of claim 16, where the one or more instructions to process the traffic comprise:
    one or more instructions that, when executed by the at least one processor, cause the at least one processor to:
        determine, based on the particular attribute, message content that is included within the content,
        determine a quantity of one or more terms, in the message content, that are not authorized by a particular policy,
        determine that the quantity satisfies a particular threshold, and
        perform filtering that precludes the content from being forwarded to a client device based on the quantity satisfying the particular threshold.

22. The method of claim 1, where the ranking indicates that the category is ranked higher than any other category of the one or more categories.

23. The node of claim 9, where the one or more processors are further to:
    receive an instruction to train a classifier associated with the node;
    obtain, based on the instruction, predetermined content associated with the set of categories;
    generate the classification information by analyzing the predetermined content; and
    store the classification information in the memory.

\* \* \* \* \*